REMOTE CONTROL MICROPHONE BIASING CIRCUIT

Filed Nov. 2, 1966

INVENTOR.
James G. S. Chua
BY Nicholas A. Camasto
ATTY.

United States Patent Office 3,430,146

Patented Feb. 25, 1969

3,430,146

REMOTE CONTROL MICROPHONE BIASING CIRCUIT

James G. S. Chua, Roselle, Ill., assignor to Admiral Corporation, Chicago, Ill., a corporation of Delaware Filed Nov. 2, 1966, Ser. No. 591,594

U.S. Cl. 325—392 5 Claims

Int. Cl. H04b 1/20

ABSTRACT OF THE DISCLOSURE

A biasing circuit for a capacitor microphone in the receiver of a remote control television system which reverses the polarity of the D.C. biasing voltage on the capacitor microphone each time the receiver is turned on and off, thereby preventing permanent polarization and resultant decrease in sensitivity of the capacitor microphone.

This invention relates in general to remote control television systems and in particular to a biasing circuit for a remote control microphone.

Acoustically-variable capacitor microphone in remote control television system generally require a relatively high direct current biasing potential for operation at a sufficient level of sensitivity. At the same time, however, these microphones are susceptible to permanent polarization when biasing potentials of the same polarity are applied to them over an extended period of time, and this polarization results in an undesirable decrease in the sensitivity of the microphone.

Accordingly, an object of this invention is to provide an improved biasing circuit for a microphone in a remote control television system.

Another object of this invention is to provide a biasing circuit for a remote control microphone which eliminates the possibility of sensitivity loss due to permanent polarization.

These objects are accomplished in accordance with this invention by providing for a change in the polarity of the direct current biasing potential applied across the microphone each time the television receiver is switched between its OFF and ON states. A first direct current biasing potential is continuously applied to one terminal of the microphone by the power supply circuitry in the remote control circuit, and a second direct current biasing potential is applied to the other terminal of the microphone by the power supply circuitry in the television receiver when the television receiver is ON. The two potentials are of the same polarity, but the magnitude of the second is greater than that of the first so that the polarity across the microphone is reversed each time the second potential is applied or removed. The magnitude of the second potential is preferably twice that of the first potential to maintain the same level of direct current bias under all conditions.

The obvious advantage of this invention is that permanent polarization of the microphone is effectively prevented, and the required sensitivity of operation is retained.

Other objects, features, and advantages of this invention and a complete understanding thereof will be gained from a consideration of the following description in connection with the drawing in which.

Figure 1:
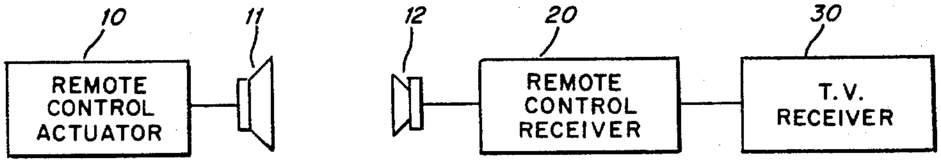
FIG. 1 is a block schematic diagram of a remote control television system.

As shown in FIG. 1, a typical remote control television system includes a remote control actuator 10 which may generate a number of control signals at different frequencies. These control signals are coupled to a transducer 11 which changes the electrical signals into transmitted sound waves. The sound waves transmitted by transducer 11 may be picked up by a microphone 12 and coupled into a remote control receiver 20. The control signals received by remote control receiver 20 may then be discriminated and used to control certain desired functions within a TV receiver 30. The number of separate control functions desired determines the number of signals to be generated by remote control actuator 10 and the number of discriminating functions required in remote control receiver 20, and each individual control signal received can be used to actuate a particular mechanism, such as an ON–OFF switch, in TV receiver 30.

Figure 2:
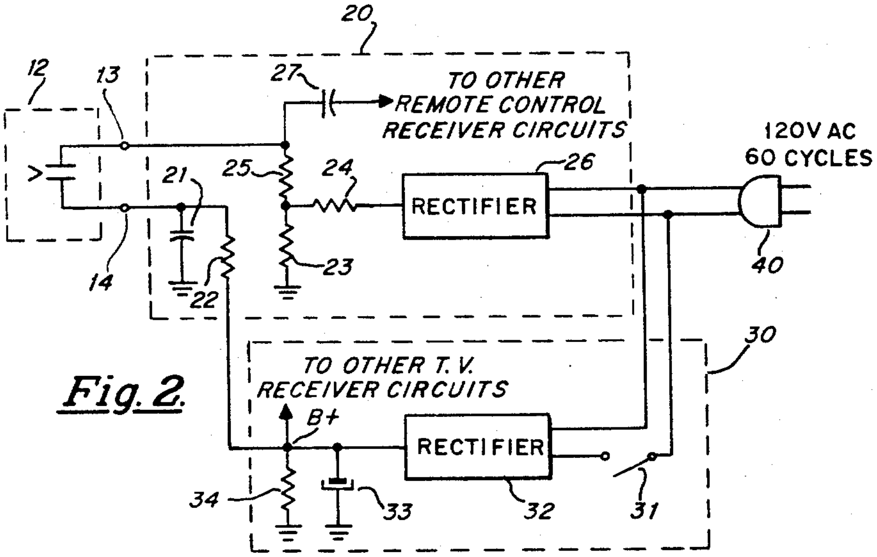
FIG. 2 is a circuit schematic diagram of a microphone biasing circuit in accordance with this invention.

In FIG. 2, a microphone biasing circuit for an acoustically-variable capacitor microphone 12 is shown. For proper sensitive operation of microphone 12, a direct current biasing potential of sufficient magnitude must be supplied across terminals 13 and 14. As shown, terminal 13 of microphone 12 is connected by way of a resistor 25 to the junction of resistors 23 and 24. The other end of resistor 23 is connected to a source of ground potential, while the other end of resistor 24 is connected to a rectifier 26, so that resistors 23 and 24 comprise a voltage divider. Rectifier 26 is connected to a line plug 40 which is used to symbolize a source of alternating current which which may be a 120 volt, 60 cycle power supply. Terminal 13 of microphone 12 is also coupled by way of a capacitor 27 to other circuits in remote control receiver 20.

Terminal 14 of microphone 12 is connected by way of a capacitor 21 to a source of reference potential and by way of a resistor 22 to B+ terminal in TV receiver 30. This B+ terminal is connected to a source of reference potential through a resistor 34 and an electrolytic capacitor 33, and also to a rectifier 32. Rectifier 32 is connected to line plug 40 by way of an ON-OFF switch 31.

The remote control microphone biasing circuit functions in the following manner. Rectifier 26 is energized by the source of alternating current and produces an output direct current potential. This output direct current potential is supplied to the voltage divider consisting of resistors 23 and 24, and an appropriately lowered voltage is supplied by way of resistor 25 to terminal 13 of microphone 12. This first direct current biasing potential is continuously applied to terminal 13 as long as rectifier 26 is connected to the alternating current source. When ON-OFF switch 31 in TV receiver 30 is in its open or OFF condition, rectifier 32 is not energized, and the B+ terminal is effectively at ground potential. This ground potential is available to terminal 14 of microphone 12 through resistor 22. Consequently, microphone 12 has a first direct current biasing potential applied across its terminals 13 and 14, and the magnitude of this biasing potential is determined by the voltage dividing ratio of the magnitudes of resistors 23 and 24. With this first direct current biasing potential across its terminals, microphone 12 is in a sensitive operating condition and will function to pick up transmitted signals for coupling to the other circuits in remote control receiver 20 by way of capacitor 27. As will be explained more fully below, if this first direct current biasing potential were maintained across terminals 13 and 14 of microphone 12 for an extended period of time, microphone 12 would tend to become permanently polarized, and its sensitivity would radically decrease.

When ON-OFF switch 31 in television receiver 30 is in its closed or ON state, rectifier 32 is energized by the alternating current sòurce, and it produces a second direct current potential on the B+ terminal. This second direct current potential is applied by way of resistor 22 to terminal 14 of microphone 12. The polarity of this second direct current biasing potential is the same as the polarity of the first direct current biasing potential applied to terminal 13, but its magnitude is greater than that of the first direct current biasing potential so that the polarity of the biasing potential across terminals 13 and 14 is reversed. Naturally, when ON-OFF switch 31 is again switched to its open or OFF position, the polarity across terminals 13 and 14 again reverses. A direct current potential of about 280 volts is available at the output of each of the rectifiers 26 anad 32. Resistors 23 and 24 may provide a 2:1 voltage dividing ratio so that the second direct current potential will have a magnitude twice that of the first.

Typically, one of the functions of the remote control system will be to change the TV receiver from its OFF to its ON state and vice versa. In such a case, ON-OFF switch 31 would function under the control of remote control receiver 20. Thus, microphone 12 would be biased by the power supply circuit in remote control receiver 20 when ON-OFF switch 31 is OFF. Then when the proper control signal is received by microphone 12 and coupled to remote control receiver 20, a control function would be initiated to change the ON-OFF switch 31 to its ON condition and, consequently, change the polarity across terminals 13 and 14 of microphone 12. Microphone 12 is then in a sensitive operating condition with its biasing polarity reversed and may receive further transmitted signals for actuating other control functions in remote control receiver 20. In the same manner, a signal to turn TV receiver OFF would be processed with a resultant return of the polarity across the terminals 13 and 14 to its original state.

Figures 3, 4:
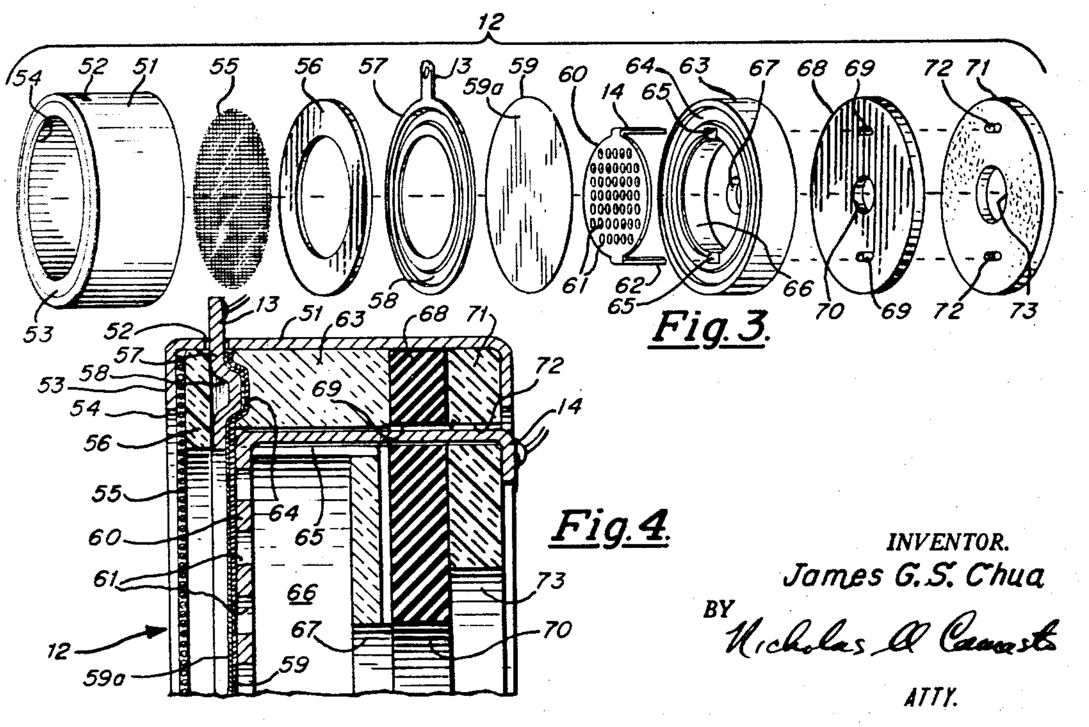
FIG. 3 is an exploded view of the elements of the microphone used in the circuit of FIG. 2.
FIG. 4 is a partial sectioned elevational view of an assembled microphone.

In FIGS. 3 and 4, the elements of one type of acoustically-variable capacitor microphones are shown. The outside case 51 of microphone 12 is shown as a hollow cylinder with a rim 53 on its front end, leaving an opening 54 therein. A wire mesh or screen 55 is first inserted into the rim of case 51 and occupies a position immediately behind rim 53. A rubber insulating washer 56 is inserted behind screen 55, and then a metal conducting ring 57 is inserted into case 51. Conducting ring 57 has a terminal tab 13 extending therefrom, and terminal tab 13 extends through aperture 52 in microphone case 51 so that electrical connection can be made thereto. Conducting ring 57 also has a groove 58 therein which forms a raised portion around the circumference thereof at the back. Element 59 is a disc of dielectric material such as Mylar with a conductive metallic coating *59a*, such as aluminum, deposited on the front face thereof. This metalized disc of dielectric material is very thin and is positioned directly behind conducting ring 57 so that ring 57 is in electrical contact with the metal surface *59a*. A cylinder 63 of insulating material such as a ceramic with a metal conducting disc 60 inserted therein in positioned behind the metalized dielectric disc 59. Insulating cylinder 63 has a circumferential depression 64 in the front thereof cooperating with the depression 58 in conducting ring 57. Consequently, when metalized dielectric disc 59 is sandwiched between metal conducting ring 57 and the insulating cylinder 63, a portion of the metalized dielectric disc 59 is deformed into groove 64. This accomplishes a stressing of the metalized dielectric disc 59 across the face of the metal conducting disc 60, and a capacitor is formed by the metallic surface *59a* and the metal disc 60 separated by the dielectric portion of disc 59. Metal disc 60 has a plurality of small holes 61 therein and a pair of terminals 14 and 62 extending back from the top and bottom thereof. Terminals 14 and 62 are inserted into slots 65 in insulating cylinder 63. A rubber insulating disc 68 and a phenolic insulating disc 71 complete the assembly of the capacitor microphone.

As shown in FIG. 4, terminals 14 and 62 extend through apertures 69 in insulating disc 68 and through apertures 72 in phenolic disc 71 for electrical connection to either one or both of these terminals at the rear of microphone case 51. Terminals 13 and 14 in FIG. 4 correspond to similarly numbered terminals in FIG. 2.

Sound waves entering the front opening 54 of microphone case 51 pass through the screen 55 and impinge upon the metallic surface *59a* of disc 59. The compressions and rarefactions of the sound waves cause dielectric disc 59 to be moved alternatively closer to and further away from metallic disc 60. It is believed that disc 59 is partly deformed into apertures 61 in disc 60 during compression portions of the sound waves. As disclosed above, sensitive operation of this acoustically variable capacitor microphone requires that a direct current biasing potential of relatively high magnitude be applied across terminals 13 and 14. It is believed that this direct current biasing potential causes the metalized surface *59a* to be attracted toward metal disc 60, which increase the tension in the disc 59 and, at the same time, increases the capacitance of the microphone by moving the two metallic surfaces closer together. The sound waves impinging on disc 59 cause corresponding fluctuations in the capacitance, and this change in capacitance results in the generation of a corresponding signal across the terminals 13 and 14.

As stated above, an acoustically variable capacitor microphone of this type is susceptible to permanent polarization when a biasing potential of the same polarity is impressed across terminals 13 and 14 over an extended period of time. This permanent polarization results from an aligning of molecular dipoles in dielectric disc 59 due to the presence of an electric field established across the disc by the biasing potential applied to terminals 13 and 14. In normal operation, these molecular dipoles, which exists throughout the dielectric medium in a randomly oriented fashion when no electric field is applied thereacross, tend to orient themselves in the direction of the electric field. If the electric field is applied for a relatively short time only, relatively few of the molecular dipoles have a chance to align themselves in the direction of the electric field and most of the dipoles will remain in a relatively random orientation. Moreover, most of the dipoles return to a random orientation after the electric field is removed. However, if the electric field is applied in the same direction over an extended period of time, a large number of these molecular dipoles in the dielectric material align themselves with the direction of the electric field, and more significantly, they remain aligned after the electric field is removed. The result of this permanent orientation of molecular dipoles is a lessening of the energy storing capacity of the capacitor created by the metallic film *59a* and the metal disc 60 with the dielectric disc 59 therebetween. The variations in capacity created by changing the position of the metallic surface *59a* with respect to the metal disc 60 will consequently decrease, and this naturally results in a degeneration in the sensitivity of the microphone.

It is apparent that the circuit of this invention as shown in FIG. 2 effectively eliminates the possibility of the dielectric disc 59 in microphone 12 becoming permanently polarized because the direction of the electric field applied between metallic film *59a* and metal disc 60 is reversed each time the state of ON-OFF switch 31 is changed. This periodic change in the orientation of the electric field through dielectric disc 59 insures that the molecular dipoles will not become permanently oriented in one direction, but will remain relatively random oriented.

The advantages of employing the B+ voltage, which is available at the TV receiver when it is ON, to provide a polarity-reversing voltage to one of the terminals of the remote control microphone are obvious, since other circuitry to perform the function of reversing the polarity on the microphone is, therefore, not required. Moreover, the alternation of polarity is accomplished each time the television receiver is switched between ON and OFF so that no separate switching by the operator of the TV receiver is required. Finally, the lifetime of the microphone is increased because its sensitivity is retained over a longer period of time.

It is to be understood that the above description of a preferred embodiment of this invention has been given for purposes of illustration and that numerous modification could be made without departing from the spirit and scope of this invention as claimed in the following claims.

The embodiments of the invention in which an exclusive property or privilege is claimed are defined as follows:

1. In combination in a remote control television system: a microphone comprising an acoustically variable capacitor including first and second terminals therefor, said microphone requiring a direct current biasing potential across said terminals for sensitive operation thereof and being susceptible to permanent polarization by biasing potentials of the same polarity applied thereacross over an extended period of time with consequent loss of sensitivity; a remote control circuit coupled in signal receiving relation across said terminals, and including first means continuously applying a first direct current potential to said first terminal; and a television receiver coupled in controlled relation to said remote control circuit, said television receiver including ON-OFF switching means and second means providing a reference potential for said second terminal when said switching means is OFF and applying a second direct current potential thereto when said switching means is ON, said second direct current potential being of the same polarity and of greater magnitude than said first direct current potential, whereby the polarity of the biasing potential across said terminals is reversed as said switching means is switched between OFF and ON, and polarization of said microphone is thereby prevented.

2. The combination as claimed in claim 1, wherein said second means comprises: an output terminal, first circuit means direct current connecting said output terminal to a source of reference potential, power supply means coupled to said switching means for producing said second direct current potential on said output terminal when said switching means is ON, and second circuit means direct current connecting said output terminal to said second terminal of said acoustically variable capacitor.

3. The combination as claimed in claim 2, wherein said first circuit means is a resistor connected between said source of reference potential and said output terminal; and said power supply means includes rectifier means connected between said switching means and said output terminal for producing said second direct current potential on said output terminal when said switching means is ON.

4. The combination as claimed in claim 1, wherein said first means includes rectifier means connectable to a source of alternating current voltage for producing an output direct current potential therefrom; voltage divider means connected to said rectifier means for producing said first direct current potential from said output direct current potential; and means direct current coupling said voltage divider means to said first terminal of said acoustically variable capacitor.

5. The combination as claimed in claim 1, wherein said magnitude of said second direct current potential is substantially twice said magnitude of said first direct current potential so that the magnitude of said direct current biasing potential on said microphone is substantially the same when said switching means is ON as when said switching means is OFF.

References Cited

UNITED STATES PATENTS

| | | |
|---|---|---|
| 3,075,171 | 1/1963 | Hansen. |
| 2,678,967 | 5/1954 | Grosskopf. |

KATHLEEN H. CLAFFY, *Primary Examiner.*

D. L. RAY, *Assistant Examiner.*

U.S. Cl. X.R.

179—106, 111